(12) United States Patent
Guillemette et al.

(10) Patent No.: US 7,032,628 B2
(45) Date of Patent: Apr. 25, 2006

(54) MOBILE PREPRESSURIZED DIAPHRAGM TYPE FLUID STORAGE TANK

(75) Inventors: Larry T. Guillemette, E. Greenwich, RI (US); Joseph A. Lane, Taunton, MA (US)

(73) Assignee: Amtrol, Inc., West Warwick, RI (US)

( * ) Notice: Subject to any disclaimer, the term of this patent is extended or adjusted under 35 U.S.C. 154(b) by 12 days.

(21) Appl. No.: 10/831,439

(22) Filed: Apr. 23, 2004

(65) Prior Publication Data
US 2004/0216801 A1 Nov. 4, 2004

Related U.S. Application Data

(60) Provisional application No. 60/467,056, filed on Apr. 30, 2003.

(51) Int. Cl.
*B65D 1/04* (2006.01)
(52) U.S. Cl. .............................. 141/1; 141/24; 141/25; 141/27; 141/114; 220/567.2; 220/585
(58) Field of Classification Search ............... 141/1–5, 141/9, 21–27, 98, 114; 220/564, 567.2, 571, 220/585; 222/95, 96, 386.5, 190, 394, 399; 184/6.3–6.5, 1.5, 106; 123/196 S, 196 R
See application file for complete search history.

(56) References Cited

U.S. PATENT DOCUMENTS

| | | | |
|---|---|---|---|
| 2,552,749 A | 5/1951 | Tabet | |
| 3,647,103 A * | 3/1972 | Berman | 220/585 |
| 3,867,999 A | 2/1975 | Cox | |
| 4,095,673 A | 6/1978 | Takeuchi | |
| 4,120,425 A | 10/1978 | Bethurum | |
| 4,698,983 A | 10/1987 | Hechavarria | |
| 5,318,080 A | 6/1994 | Viken | |
| 5,398,851 A | 3/1995 | Sancoff et al. | |
| 5,487,447 A | 1/1996 | Martinez Velazquez | |
| 5,488,935 A * | 2/1996 | Berry, Jr. | 123/196 S |
| 5,772,402 A | 6/1998 | Goodman | |
| 5,853,068 A | 12/1998 | Dixon et al. | |
| 5,871,068 A | 2/1999 | Selby | |
| 6,022,473 A | 2/2000 | Mickelson | |
| 6,073,666 A | 6/2000 | Clark, II | |
| 6,148,789 A | 11/2000 | Johns | |
| 6,508,280 B1 | 1/2003 | Capstran | |

\* cited by examiner

*Primary Examiner*—Timothy L. Maust
(74) *Attorney, Agent, or Firm*—George W. Neuner; Edwards Angell Palmer & Dodge LLP

(57) ABSTRACT

A mobile prepressurized fluid storage tank is disclosed where the compressed air, completely separated from the fluid by a flexible diaphragm, dispenses the fluid under pressure, e.g., into an engine. The prepressurized diaphragm-type fluid storage tank is initially charged with a gas on one side of the diaphragm. A connector on the other end of the tank is connected to the fluid pumping system. Fluid is pumped into the tank until a predetermined pressure is reached and then the fill valve is shut off. A second connection attached to a bottom system connection has a hose. At the end of the hose there is a fluid shut off valve. Dispensing of the fluid takes place through the fluid shut off valve. The prepressurized fluid storage tank is mounted on a frame that contains wheels for mobility.

17 Claims, 4 Drawing Sheets

MOBILE PREPRESSURIZED DIAPHRAGM TYPE FLUID STORAGE TANK

This application claims the benefit of Provisional Application No. 60/467,056, filed Apr. 30, 2003.

FIELD OF THE INVENTION

This invention relates to a method and apparatus for storing and dispensing oil or other fluids into an engine or other devices.

BRIEF DESCRIPTION OF THE PRIOR ART

Changing of automobile engine oil and other fluids varies from the one car garage where each can of oil is opened separately to the multi-bay garages where fixed overhead piping and reel systems are employed. The fixed overhead and reel system eliminates the expense of opening individual cans, the labor involved in opening and disposing of the cans and the added time required to install oil not under pressure. The drawbacks to this system is the initial overhead costs, the lack of versatility to be able to change the type of fluid, a given location being dictated by the fixed piping and hose reel length and the compromise of safety by having overhead hoses under pressure. Oil is pumped from an atmospheric storage tank to the reel hose system, thus, providing the possible presence of water in oil. Thus, the oil is delivered to the engine under pumping pressure.

U.S. Pat. No. 4,120,425 describes a technique for dispensing champagne. The system has a wine storage vessel with a flexible diaphragm for pneumatic pressurization without the gas contacting the wine. A metering valve on the vessel limits flow into a long, small diameter tube having an on-off valve at the end. The tube is sufficiently long (about 30 ft.) and small enough in diameter (⅛ inch) that viscous drag drops the pressure on the wine and inhibits excessive bubble formation. The wine is filled into the container at the winery and, then, pressure on the diaphragm is set to 150 psi.

U.S. Pat. No. 5,318,080 describes a transmission fluid changer. In one embodiment (FIG. 3), a container has two chambers separated by a flexible diaphragm. There is an outlet port at the top of the container from one chamber and an inlet port at the bottom to the second chamber. The upper chamber is a fresh supply tank and the lower chamber is a used fluid receiver for used fluid. In use, the lower chamber is completely drained of old fluid and the upper chamber is filled with clean fresh fluid. After connecting the changer to the transmission, the transmission vehicle is started and the transmission pump is used to pump old fluid to the lower chamber while fresh clean fluid is returned to the transmission from the upper chamber.

U.S. Pat. No. 5,398,851 describes a liquid dispensing device includes a hollow gas- and liquid-tight casing and a flexible membrane disposed entirely across the casing interior to provide a propellant chamber and a liquid chamber. Two mutually reactive chemicals separated by a barrier are stored in the propellant chamber. Breach of the barrier permits the chemicals to react and form a propellant gas, which expands against the membrane and expels liquid on the opposite side of the membrane.

U.S. Pat. No. 5,488,935 describes a pressurized oil injection pre-lubrication system for an oil gallery in an engine block of an engine in a motor vehicle. The system has a pressure accumulator with a normally closed electromagnetic valve connected to the ignition switch. Turning on the ignition opens the valve to allow oil to flow into the oil gallery prior to turning the ignition switch to the start position. The pressure accumulator is a storage tank with a flexible wall dividing it into two compartments, one for holding pressurized gas, the other for holding the oil.

U.S. Pat. No. 5,772,402 describes a pre-charged vacuum fluid change, disposal apparatus. In one embodiment, a tank is divided into two chambers. In one chamber a near absolute vacuum is provided. Waste oil is removed from a vehicle into this chamber due to the vacuum. Thus, no pump is required. The second chamber contains fresh fluid to replenish for the waste oil removed.

U.S. Pat. No. 5,871,068 describes a device for precise replacement of liquids. The device includes a housing and a piston or diaphragm for separating the housing into inlet and exit portions. Pressure from the volume of liquid in a closed vessel that is to be replaced is used to measure the amount of liquid replacing the liquid that is in the closed vessel. In operation, used liquid enters the inlet portion providing pressure on the diaphragm and precisely controls the amount of replacement liquid from the exit portion.

New and better ways for dispensing fluids, particularly for servicing of vehicles, is still desired. It would be desirable to provide a mobile diaphragm-type fluid storage tank having a diaphragm defining a gas chamber and a separate fluid chamber where the gas chamber is pre-pressurized to a set pressure, after which a fluid is charged to the fluid chamber and to provide a method for dispensing oil or other fluids that comprises providing the pre-pressurized, diaphragm tank, charging the tank with oil or other fluid, then dispensing the fluid under pressure.

SUMMARY OF THE INVENTION

The present invention eliminates the need for fixed piping, eliminates hose and reel assemblies, eliminates the unsafe feature of having high pressure hose overhead, provides unlimited access to any location, and provides the versatility of changing to other grades of fluids. The invention also provides the convenience of bringing, for example, oil to the vehicle in bulk without opening any cans and having the oil under pressure for rapid dispensing.

In accord with the present invention, a mobile pressurized fluid storage tank stores and dispenses oil or other fluids under pressure by a compressed gas. The storage tank has a flexible diaphragm or bladder that acts as a pressure transfer barrier to separate the compressed gas from the fluid, e.g., oil. A predetermined gas pressure is applied to the tank through a "Schrader-type" tire valve core. Oil or other fluid is pumped into the tank using a connector port at the bottom of the tank as the conduit, flexing the diaphragm or bladder and further compressing the air to a predetermined pressure at which point pumping is discontinued and the pump is disconnected. The oil or other fluid then can be readily dispensed by moving the mobile storage tank to the site where the oil or other fluid is needed and dispensing the oil or other fluid through a hose.

Thus, the invention provides a method for dispensing oil or other fluids for maintenance of mechanical equipment, the method comprising: providing a mobile prepressurized diaphragm/bladder type storage tank, wherein the tank comprises a first chamber for storing a fluid to be dispensed and a second chamber for storing a gas under pressure, a flexible diaphragm/bladder attached to the tank, a pressurizing port for supplying a gas to pressurize the second chamber and a port in the first chamber for filling the chamber with fluid and/or for supplying the oil or other fluids under pressure; pressurizing the second chamber with the gas, wherein the gas is one side of the diaphragm/bladder; pumping the oil or other fluid into the first chamber, wherein the oil or other fluid is on the opposite side of the diaphragm/bladder; and dispensing the oil or other fluid under pressure. Thus, for example, oil can be dispensed into an engine. The method of dispensing oil in accord with the present invention can reduce the addition of water into the oil to reduce engine wear due to corrosion.

Also provided by the present invention is a mobile prepressurized diaphragm/bladder type storage tank comprising a first chamber for storing a fluid to be dispensed and a second chamber for storing a gas under pressure, a flexible diaphragm/bladder attached to the tank for separating a gas from oil or other fluids to be dispensed, a pressurizing port for supplying the gas to pressurize the second chamber and a port in the first chamber for filling the chamber and/or for supplying the oil or other fluids under pressure.

Various embodiments of the invention provide one or more of the following:
  complete separation of compressed gas and fluid;
  fluid for a vehicle under pressure without the need of pumps while lubricating, or of reels, or of overhead fixed piping and long extension hoses;
  mobility for ease of access to any location;
  diaphragm/bladder elastomer material compatible with the fluid in contact;
  improved the safety of applying oil and other fluids to a vehicle by not requiring overhead hoses under pressure; and/or
  versatility of changing the fluid which cannot be done practically with a fixed piping system.
  optimum pressure vessel volume to liquid volume ratio to ensure that there remains adequate pressure to evacuate all of the liquid.

In a preferred embodiment, a mobile prepressurized diaphragm/bladder type storage tank comprises a bottom section having a bottom and side walls against which the diaphragm/bladder is fixed, thereby defining a liquid compartment, and a plurality of domed sections comprising side walls and a domed top. The bottom section has a port for filling and emptying the compartment. A first domed section is attached to the bottom section and a second domed section is attached to the first domed section such that the bottom section and the domed sections form a stack. Subsequent domed sections can be attached to provide the desired volume of pressurizing gas. Each intermediate domed section has an opening in the dome to permit exchange of pressurizing gas between the domed chambers. The first domed section provides a surface to confine expansion of the diaphragm/bladder, which can prevent overfilling of the liquid compartment.

As used herein, the terms flexible diaphragm and bladder are interchangeable in connection with this invention.

DETAILED DESCRIPTION OF THE INVENTION INCLUDING PREFERRED EMBODIMENTS

Figure 1:
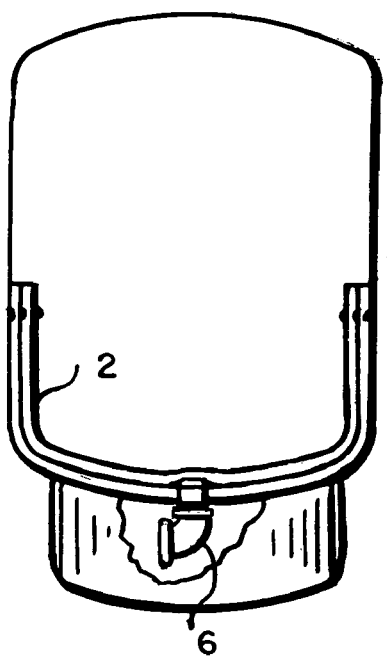
FIG. 1. is an elevational view showing a prepressurized mobile storage tank in accord with one embodiment of the present invention.
Figure 2:
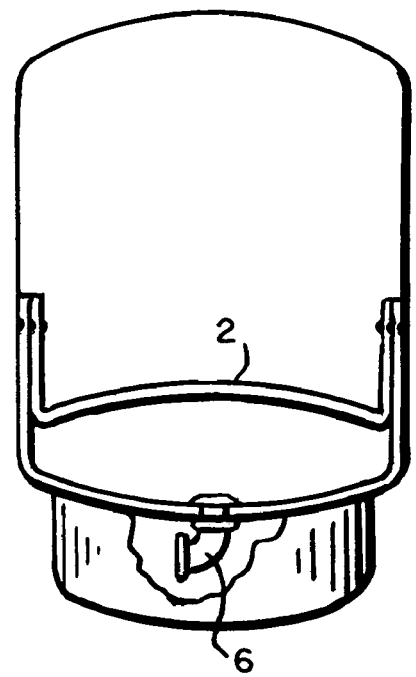
FIG. 2 shows the tank of FIG. 1 partially filled with oil.
Figure 3:
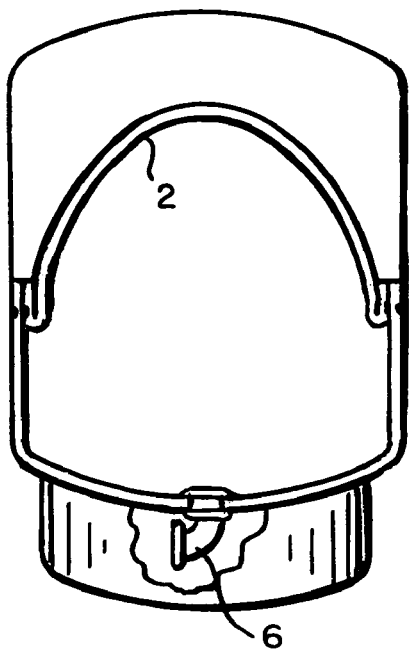
FIG. 3 shows the tank of FIG. 1 filled with oil.
Figure 4:
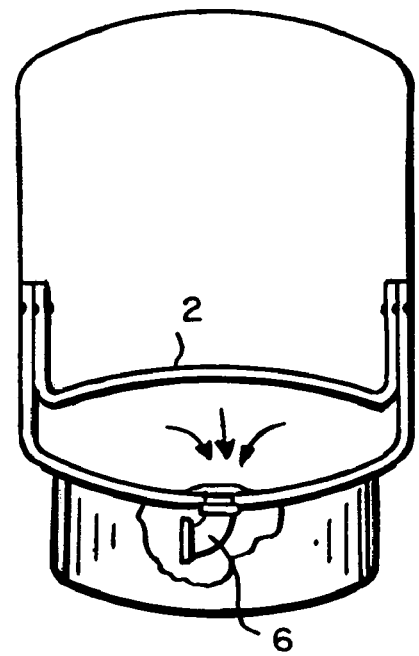
FIG. 4 shows the tank of FIG. 1 with oil partially dispensed.
Figure 5:
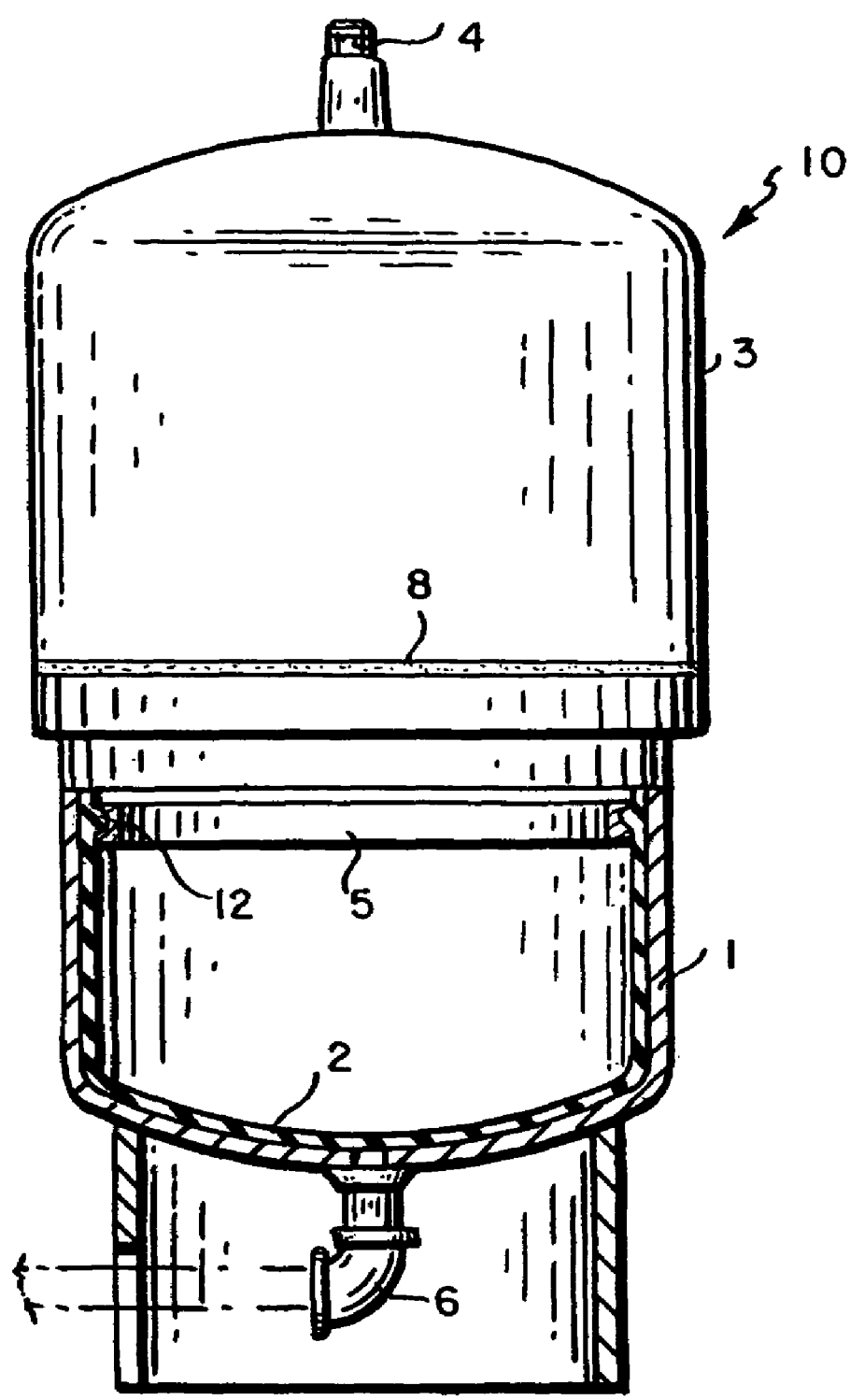
FIG. 5 is another elevational view, partially in cross section, showing a prepressurized mobile storage tank in accord with one embodiment of the present invention.

Referring to the drawings, a mobile prepressurized diaphragm oil storage tank 10 in accord with the present invention comprises a tank attached to a frame adapted for mobility. The frame can have wheels or can be structured for easy pick up by a cart or other transporting means. The storage tank preferably comprises at least two chambers. A lower chamber (1) houses the diaphragm (2). A ring (5) removably attaches the diaphragm to the tank in the lower chamber. Connector (6) permits filling and discharging fluids from the tank.

The flexible diaphragm (2) is made of an elastomer that is compatible with the fluids that it contacts. It is mechanically locked to the lower chamber (1), preferably with a concave locking ring (5) that mates with a bead (12) in the diaphragm membrane. The diaphragm (2) preferably is molded to conform to the inner shape of the lower chamber (1). The diaphragm bead preferably is an "O" ring type of bead that mates with the ring (5). The wall of the lower chamber (1) preferably is grooved for positioning the diaphragm (2) to be locked in place with concave ring (5). Thus, the diaphragm (2) is compressed between the ring (5) and the wall of the lower chamber (1) forming a hermetic seal against air and the fluid.

The upper chamber (3) can be of any size depending on the desired total tank volume. The upper chamber (3) preferably is of the same design as the lower chamber (1). A conventional air stem valve (4), commonly referred to as a "Schrader" valve stem, or the like, is provided in the upper chamber. The air (gas) for pressurizing the tank can be added or removed via the valve stem (4). The lower chamber (1) and upper steel chamber (3) preferably are joined together by a welding process (see weld 8). However, a mechanical joint also can be used, as long as it provides a structural hermetic seal.

The tank is placed, preferably attached, on a frame with wheels (not shown) that makes it mobile. The tank and ring can be made of any suitable material capable of withstanding the pressure desired and compatible with the fluids to be stored and dispensed. Steel is a convenient material for making the tank and ring.

In use, the tank is pressurized initially with air or another gas to a predetermined first pressure through the valve stem 4 in the upper chamber 3. Then, oil or another dispensable fluid is pumped into the lower chamber 1 through connector port 6 until the pressure in the tank reaches a predetermined second pressure value. The oil or other fluid can be dispensed at any location to which the tank is moved. Preferably, the tank has a fluid dispensing port at or near the bottom of the lower chamber for dispensing the oil or other fluid. Also, a hose preferably is attached to the dispensing port and the hose has a control valve at its opposite end for controlling the dispensing of the oil or other fluid at the place where it is needed. Of course, one port (e.g., connector 6) in the lower chamber preferably can be adapted for both filling and dispensing the fluid by means well known to those skilled in the art.

Figure 6:
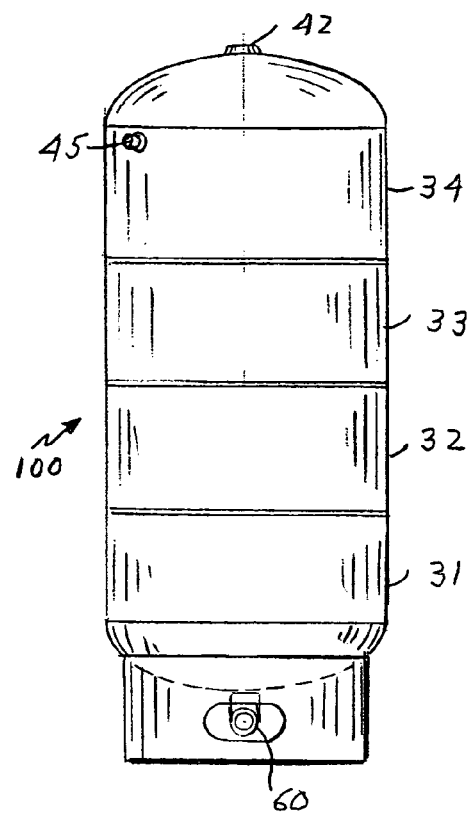
FIG. 6 is an elevational view of a prepressurized mobile storage tank in accord with another embodiment of the present invention.
Figure 7:
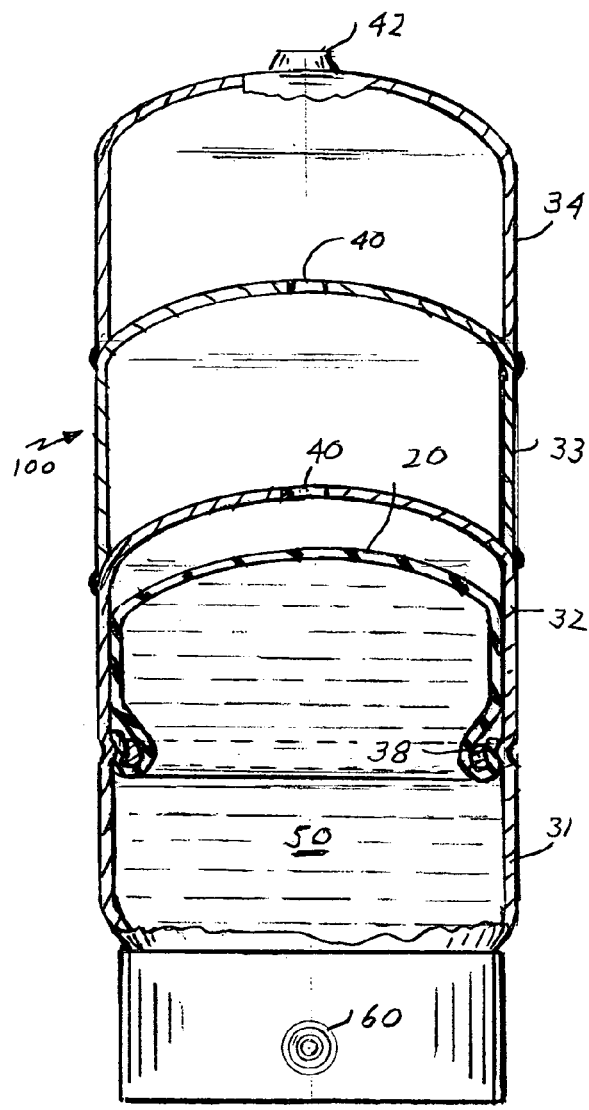
FIG. 7 is an elevational view, partially in cross section, of the storage tank of FIG. 6, illustrated with the liquid compartment substantially filled.

A preferred embodiment of a mobile prepressurized diaphragm/bladder type storage tank 100 in accord with the present invention is illustrated in FIGS. 6 and 7. A bottom section 31 has a bottom and side walls against which the diaphragm/bladder 20 is fixed using an expanded ring 38, thereby defining a liquid compartment containing a liquid 50. In the storage tank as illustrated, three domed sections 32, 33, 34 are used to form the storage tank. Each of domed sections 32, 33 have an opening 40 for communication of pressurizing gas between the chambers. The top dome has a valve seal 45 for pressurizing or depressurizing the chambers. Preferably the top dome also has a nut, covered by a nut cap 42 in the figures, for use in handling of the tank.

The sections preferably welded together in a stack, as shown. Alternatively, the sections can be connected mechanically, as long as a seal is provided to maintain pressure. This construction permits the use of a plurality of identical domed sections for economical manufacturing. The number of domed sections used depends upon the desired volume of pressurizing gas. The first domed section also provides a safety factor against overfilling of the liquid compartment.

In assembling the structure, the bladder 20 is installed in the bottom section 31 and fixed with the expansion ring 38, then the domed sections are attached to complete the tank.

Figure 8:
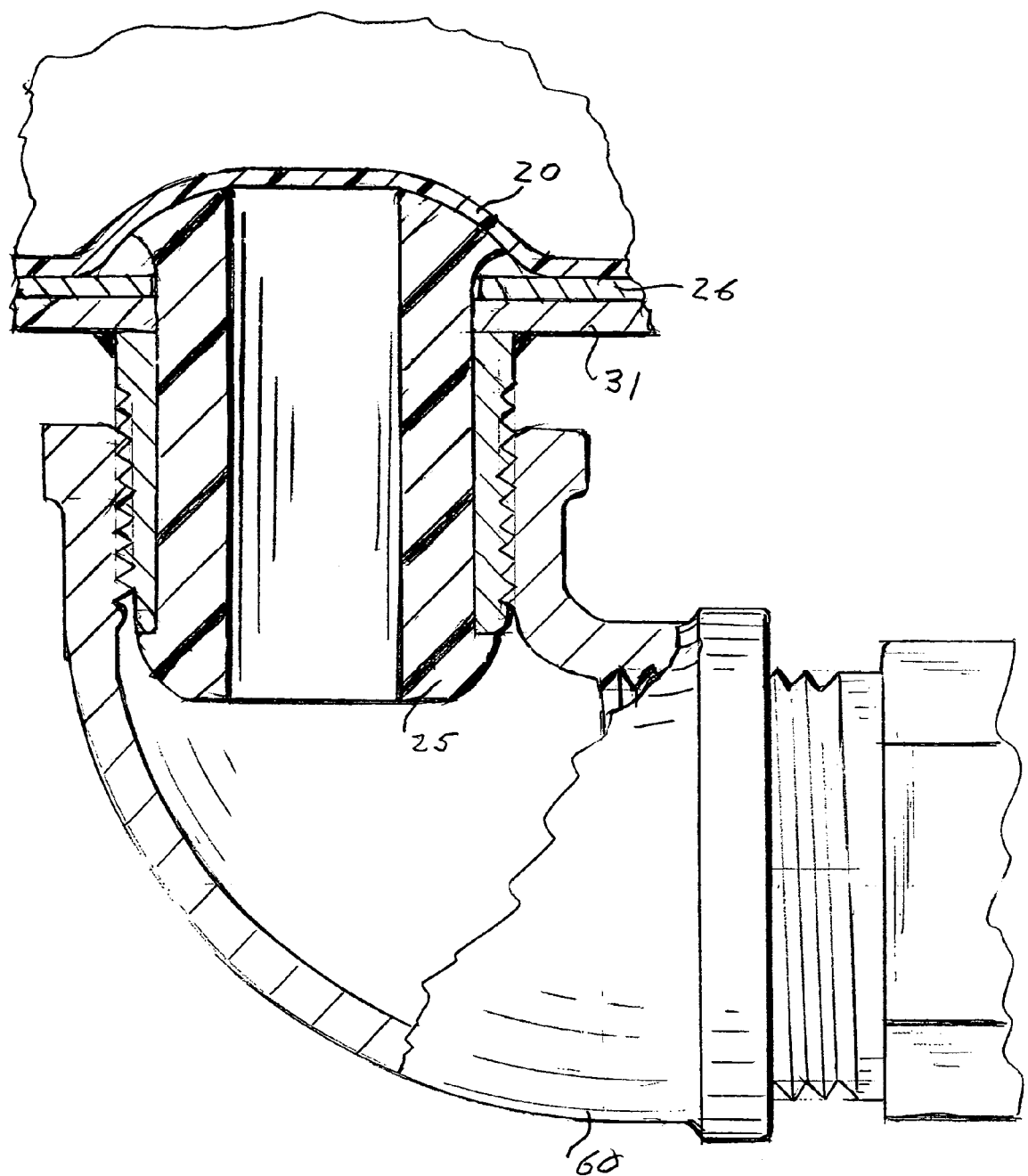
FIG. 8 is side view, partially in cross section, of the port for filling and emptying the liquid compartment of the storage tank of FIG. 6.

The bottom section 31 has a port 60 for filling and emptying the liquid compartment. As further shown in FIG. 8, preferably a diaphragm retainer 25 is inserted into the opening in the bottom of bottom section 31 to keep the diaphragm from being pushed into the port 60 when the pressurized storage tank is empty of liquid. The remainder of the exit port is conveniently made from conventional pipe fittings. A solder washer 26 preferably is used to aid when attaching the threaded pipe section to the bottom section 31.

The diaphragm retainer can be made of any suitable material that is compatible with the fluid being dispensed. Preferably, the diaphragm retainer is molded from a resin.

The invention has been described in detail including the preferred embodiments. However, it can be appreciated that those skilled in the art, upon consideration of this specification and the drawings, may make modifications and improvements within the spirit and scope of the invention as set forth in the claims. For example, the fluid to be dispensed can be pumped into the first chamber before the gas for pressurization is added to the second chamber. As another alternative, the diaphragm can be attached to the upper chamber. Additionally, by way of example, the chambers can be side by side. Other alternatives will be apparent to those skilled in the art.

What is claimed is:

1. A method for dispensing oil or other fluids at a site where the oil or other fluid is required for maintenance of mechanical equipment, the method comprising:

providing a mobile prepressurized diaphragm/bladder type storage tank, wherein the tank comprises a first chamber for storing a fluid to be dispensed and a second chamber for storing a gas under pressure, a flexible diaphragm/bladder attached to the tank, a pressurizing port for supplying a gas to pressurize the second chamber and a port in the first chamber for filling the chamber and/or for supplying the oil or other fluids under pressure, said mobile prepressurized diaphragm/ bladder type storage tank being structured and arranged mobility for ease of access to any location;

pressurizing the second chamber with the gas, wherein the gas is located on one side of the diaphragm/bladder;

filling the oil or other fluid into the first chamber, wherein the oil or other fluid is on the opposite side of the diaphragm/bladder;

moving the mobile prepressurized diaphragm/bladder type storage tank to the site where the oil or other fluid is needed for maintenance of mechanical equipment; and dispensing the oil or other fluid under pressure.

2. The method according to claim 1, wherein the diaphragm/bladder is attached to the tank using a ring that exerts pressure against the diaphragm/bladder to fix it inside the tank.

3. The method according to claim 1, wherein the first chamber is a lower chamber and the second chamber is an upper chamber.

4. The method according to claim 1, wherein the pressurizing step chronologically precedes the filling step.

5. The method according to claim 1, wherein the filling step precedes the pressurizing step.

6. The method according to claim 1, wherein oil is dispensed into an engine.

7. The method according to claim 1, wherein during the pressurizing step, gas is provided into the second chamber until a first pressure is attained within the second chamber and, then, a fluid is filled into the first chamber until a second pressure is attained, whereby the tank is ready for dispensing the fluid under pressure.

8. A mobile prepressurized diaphragm/bladder type storage tank capable of being moved to a site where the oil or other fluid is needed for maintenance of mechanical equipment, the mobile prepressurized diaphragm/bladder type storage tank comprising a first chamber for storing a fluid to be dispensed and a second chamber for storing a gas under pressure, a flexible diaphragm/bladder attached to the tank for separating the gas from oil or other fluids to be dispensed, a pressurizing port for supplying the gas to pressurize the second chamber and a port in the first chamber for filling the chamber and/or for supplying the oil or other fluids under pressure for maintenance of mechanical equipment, said mobile prepressurized diaphragm/bladder type storage tank being structured and arranged mobility for ease of access to any location.

9. The mobile prepressurized diaphragm/bladder type storage tank according to claim 8, wherein the second chamber limits the displacement of the flexible diaphragm/ bladder when filling the first chamber.

10. The mobile prepressurized diaphragm/bladder type storage tank according to claim 8, wherein the diaphragm/ bladder is attached to the tank using a ring that exerts pressure against the diaphragm/bladder to fix it inside the tank.

11. The mobile prepressurized diaphragm/bladder type storage tank according to claim 8, wherein the first chamber is a lower chamber and the second chamber is an upper chamber.

12. The mobile prepressurized diaphragm/bladder type storage tank according to claim 8, wherein oil is stored in the first chamber.

13. The mobile prepressurized diaphragm/bladder type storage tank according to claim 8, wherein the second chamber has a stem valve for introducing a pressurizing gas.

14. The mobile prepressurized diaphragm/bladder type storage tank according to claim 8, wherein the second chamber contains a pressurizing gas.

15. A mobile prepressurized diaphragm/bladder type storage tank comprising a bottom chamber for receiving a fluid to be dispensed and a plurality of domed chambers for receiving a pressurized gas, a flexible diaphragm/bladder attached to the tank for separating the gas from the fluid to be dispensed, a pressurizing port for supplying the gas to pressurize the domed chambers and a fluid port in the bottom chamber for filling the tank with fluid to be dispensed and/or dispensing the fluid under pressure,
  wherein a first domed chamber has an opening in the dome for communication of pressurizing gas with a second domed chamber, and
  wherein the pressurizing port is in one of the plurality of domed chambers.

16. The mobile prepressurized diaphragm/bladder type storage tank according to claim 15, further comprising a diaphragm retainer located in the fluid port.

17. A method for reducing the absorbsion of water into the oil when stored and dispensing oil into engines at a site where the oil or other fluid is required for maintenance of such engines, the method comprising:
  providing a mobile prepressurized diaphragm/bladder type storage tank, wherein the tank comprises a first chamber for storing a fluid to be dispensed and a second chamber for storing a gas under pressure, a flexible diaphragm/bladder attached to the tank, a pressurizing port for supplying a gas to pressurize the second chamber and a port in the first chamber filling the chamber and/or for supplying the oil or other fluids under pressure, said mobile prepressurized diaphragm/bladder type storage tank being structured and arranged mobility for ease of access to any location;
  pressurizing the second chamber with the gas, wherein the gas is located on one side of the diaphragm/bladder;
  filling the oil or other fluid into the first chamber, wherein the oil or other fluid is on the opposite side of the diaphragm/bladder;
  moving the mobile prepressurized diaphragm/bladder type storage tank to the site where the oil or other fluid is needed for maintenance of mechanical equipment; and
  dispensing the oil or other fluid under pressure,
  thereby reducing the addition of water into the oil to reduce engine wear due to corrosion.

* * * * *